Feb. 16, 1926.

E. J. ARMSTRONG

CLUTCH

Filed Jan. 14, 1924

1,572,870

2 Sheets-Sheet 1

Inventor
Edwin J. Armstrong
Attorney

Feb. 16, 1926.

E. J. ARMSTRONG

CLUTCH

Filed Jan. 14, 1924     2 Sheets-Sheet 2

1,572,870

Inventor
Edwin J. Armstrong
by W. R. Lurf
Attorney

Patented Feb. 16, 1926.

1,572,870

UNITED STATES PATENT OFFICE.

EDWIN J. ARMSTRONG, OF ERIE, PENNSYLVANIA, ASSIGNOR, BY DIRECT AND MESNE ASSIGNMENTS, TO ERIE STEAM SHOVEL COMPANY, OF ERIE, PENNSYLVANIA, A CORPORATION OF PENNSYLVANIA.

CLUTCH.

Application filed January 14, 1924. Serial No. 686,020.

*To all whom it may concern:*

Be it known that I, EDWIN J. ARMSTRONG, a citizen of the United States, residing at Erie, in the county of Erie and State of Pennsylvania, have invented new and useful Improvements in Clutches, of which the following is a specification.

This invention is designed to simplify a clutch construction, particularly clutch constructions of very high power in a small space.

The invention is illustrated in the accompanying drawings as follows:—

Figure 1:
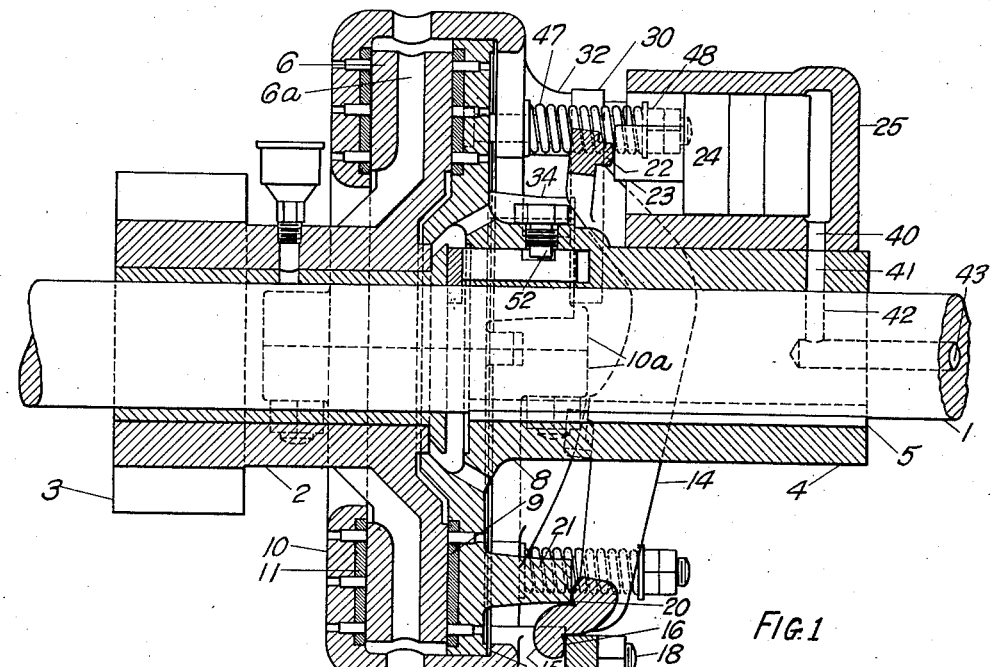
Figure 3:
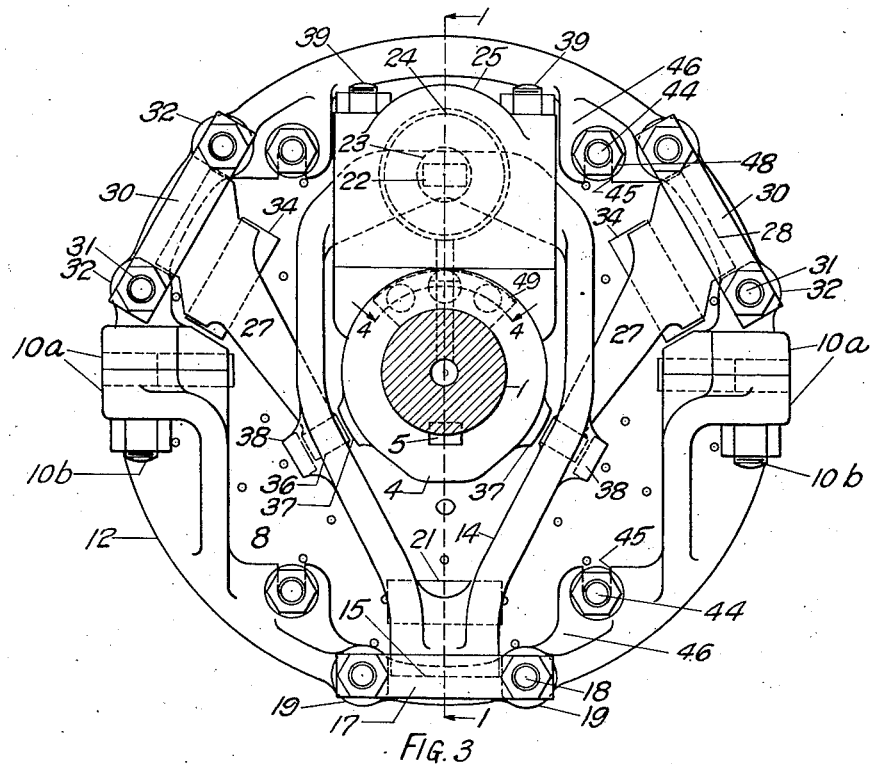

Fig. 1 shows a central sectional view through the clutch on the line 1—1 in Fig. 3, with the clutch in engaged position.

Figure 2:
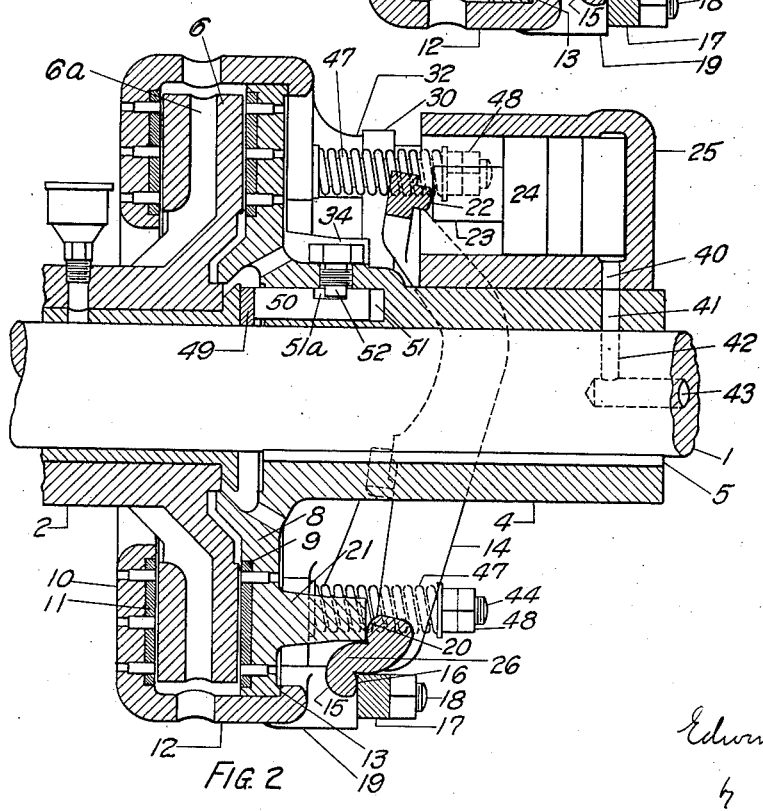

Fig. 2 a similar section with the clutch in disengaged position.

Fig. 3 an end view of the clutch.

Figure 4:
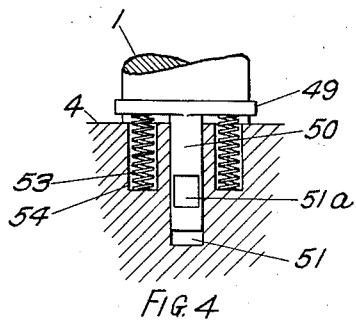

Fig. 4 a section on the line 4—4 in Fig. 3.

Figure 5:
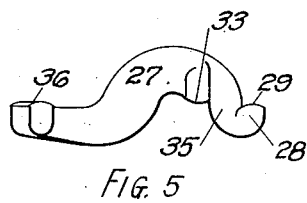

Fig. 5 a detached view of one of the clutch levers.

1 marks the shaft on which the clutch is mounted and through which the clutch is driven, 2 a driven member journaled on the shaft carrying a gear 3, and 4 a driving member rigidly mounted on the shaft 1 and locked against rotation thereon by a spline 5. While I have designated these the driving and driven members it will readily be understood that either may be the driving member. An inside double faced friction disc 6 extends from the driven member. This has the ventilating passages 6ª extending through it. A friction disc 8 extends from the member 4 and has a friction surface 9 engaging one side of the disc 6 and a friction plate 10 having a friction surface 11 opposes the opposite side of the disc 6. A flange 12 extends from the plate 10 over the disc 6 and over the disc 8 being provided with a shoulder 13 forming a stop regulating the separation of the plates 8 and 10 as the clutch is disengaged. A main lever 14 has a fulcrumed end 15 with a rolling surface 16 operating under a plate 17. The plate is secured by bolts 18 on projections 19 extending from the flange 12. The lever also has a rolling surface 20 operating on a projection 21 extending from the disc 8. The lever straddles the member 4 and at its opposite end has a thrust surface 22 which is engaged by a projection 23 on a piston 24. The piston 24 operates in a cylinder 25 mounted on the member 4. The lever 14 has a portion 26 between the fulcrum end 15 and the rolling surface 20 which loosely fills the space between the projection 21 and the plate 17 and the end 15 fills the space between the projections 19 so that the lever is locked in place without further provision for mounting.

Auxiliary levers 27 have the fulcrumed ends 28 with rolling surfaces 29 and these surfaces extend under the plates 30 which are secured by screws 31 on projections 32 extending from the flange 12. These projections 32 and the projections 19 are equally spaced apart on the circumference of the disc so that the pressure on the friction surface is equalized. Each lever 27 has a rolling surface 33 which engages a projection 34 extending from the disc 8 and each lever has a portion 35 which is locked in the space between the projection 34 and the plate 30 in the same manner as the main lever is locked between the projection 21 and the plate 17. The levers 27 have the rolling surfaces 36 which engage the lever 14 and projections 37 on the member 4 and projections 38 on the lever 14, locking the ends of the levers 27 in position relatively to the main lever.

It will readily be seen that as pressure is put on the main lever by the piston, it operating on the projection 21 and plate 17 will draw the plates 8 and 10 toward each other. At the same time the levers 27 are moved so as to draw the other points of the plates similarly together.

The cylinder 25 is secured to the member 4 by bolts 39 and fluid is delivered to it through passages 40 in the cylinder wall 41 in the member 4, a radial opening 42 in the shaft 1 and an axial opening 43 in said shaft.

Pins 44 extend from the plate 8 through slots 45 in ears 46 extending inwardly from the flange 12. Springs 47 are arranged around the pins 44 and nuts 48 are secured on to the outer ends of the pins, thus putting the springs under tension. It will readily be seen that the springs being compression springs tend to separate the plates 8 and 10.

In order that the parts may be readily assembled and the friction plates readily assembled for renewal I prefer to make the member 10 diametrically separable. For this reason it is provided with ears 10ª through which bolts 10ᵇ extend for securing the two parts together. It will be noted that the slots 45 are in a direction to permit the separation of the two parts without the removal of the pins 44.

In order to locate the plates 8 and 10 so as to have both friction surfaces out of contact with the central disc when the clutch is disengaged I provide a separating plate 49 which is arranged between the member 4 and the member 2. This plate has a pin 50 which extends into an opening 51 in the end of the member 4. It has a slot 51ª into which a screw 52 extends. The slot is so proportioned as to give the desired limit of movement to the plate 49. Springs 53 operate against the plate 49. The springs extend into sockets 54 in the end of the member 4. When the springs 47 separate the plates 8 and 10 the springs 53 operating on the plate 49 locate the member 8 and inasmuch as the shoulders 13 locate the plate 10 relatively to the plate 8 the two friction surfaces are located out of contact with the central disc.

What I claim as new is:—

1. In a clutch, the combination of clutch engaging members; and a lever system for said members comprising a main lever operating upon said members at one point of their circumference and extending across the axis thereof, and an auxiliary lever reversely arranged with relation to the main lever and operating upon a point in the circumference at the opposite side of the axis of the clutch.

2. In a clutch, the combination of clutch engaging members; and a lever system for said members comprising a main lever operating upon said members at one point of their circumference, said lever having separated arms extending around the axis of the clutch, said arms being united at the opposite side of the clutch, and auxiliary levers oppositely disposed to the main lever and equally spaced from the point of operation of the main lever, said auxiliary levers being actuated by the main lever.

3. In a clutch, the combination of clutch engaging members; and a lever system for said members comprising a main lever operating upon said members at one point of their circumference, and an auxiliary lever oppositely disposed to the main lever, said auxiliary lever being operated by the main lever and operating upon a different point of the circumference of the clutch members, said levers having rolling fulcrums.

4. In a clutch, the combination of clutch engaging members; and a lever system for said members comprising a main lever operating upon said members at one point of their circumference, and an auxiliary lever oppositely disposed to the main lever, said auxiliary lever being operated by the main lever and operating upon a different point of the circumference of the clutch members, said levers having rolling fulcrums and having portions confined by the clutch members to retain the levers in assembled position.

5. In a clutch, the combination of clutch engaging members; and a lever system for said members comprising a main lever operating upon said members at one point of their circumference, and an auxiliary lever oppositely disposed and operated by said main lever and operating on a different point in the circumference of said members from that of the main lever, said levers having a connecting portion between their fulcrums housed by portions on the clutch members to retain the levers in position.

6. In a clutch, the combination of clutch engaging members; a lever system for said members comprising a main lever; projections on one of the clutch members between which the fulcrum end of the lever is placed; a plate on said projections operating as a fulcrum; a projection on the other member engaging the lever; and a lever oppositely disposed to the main lever operated by the main lever and acting on said members.

7. In a clutch, the combination of clutch engaging members; a lever system for said members comprising a main lever operating upon said members at one point of their circumference, and an auxiliary lever oppositely disposed and operated by said main lever and operating on a different point in the circumference of said members from that of the main lever, said levers having their fulcrum ends arranged between projections on one of the clutch members; removable plates on said projections forming the fulcrums for said levers; and projections on the other of said plates engaging said levers.

8. In a clutch, the combination of clutch engaging members; a lever system for said members comprising a main lever operating upon said members at one point of their circumference, and an auxiliary lever oppositely disposed and operated by said main lever and operating on a different point in the circumference of said members from that of the main lever, said levers having their fulcrum ends arranged between projections on one of the clutch members; removable plates on said projections forming the fulcrums for said levers, and projections on the other of said members engaging said levers, said fulcrums enclosing the levers to retain them in position.

9. In a clutch, the combination of clutch engaging members; a lever system for said members comprising a main lever operating upon said members at one point of their circumference, and an auxiliary lever oppositely disposed and operated by said main lever and operating on a different point in the circumference of said members from that of the main lever; a cylinder mounted on one of the members; and a fluid actuated means mounted on one of the clutch members operating on the main lever.

10. In a clutch, the combination of clutch engaging members; a lever system for said members comprising a main lever operating upon said members at one point of their circumference, and an auxiliary lever oppositely disposed and operated by said main lever and operating on a different point in the circumference of said members from that of the main lever; a cylinder mounted on one of the members; and a piston in the cylinder acting directly on the main lever.

11. In a clutch, the combination of clutch engaging members; a lever system for said members comprising a main lever operating upon said members at one point of their circumference, and an auxiliary lever reversely arranged with relation to and operated by said main lever and operating on a different point in the circumference of said members from that of the main lever; and spring means operating on the members between the points of engagement by the levers for separating the clutch members.

12. In a clutch, the combination of engaging members; a lever system for said members comprising a main lever operating upon said members at one point in their circumference and two auxiliary levers oppositely disposed to the main lever and operating upon equally spaced points in the circumference of said members and operated by the main lever; and a spring arranged between each point of engagement of the levers with the members for disengaging the members.

13. In a clutch, the combination of an inner friction disc; outer friction plates at opposite sides of the inner disc, one of said plates having a flange extending over the other of said plates; a system of friction levers comprising a main lever operating on the flange extending across the clutch, and auxiliary levers oppositely disposed and operated by the main lever; ears on the flange extending from the companion friction plate; pins on said companion friction plate extending through the ears; and springs on the pins.

14. In a clutch, the combination of an inner friction disc; friction plates at each side of the disc; means for closing the plates; springs for separating the plates to disengage the clutch; and a locating plate between the friction plates, said plate having a limited yielding movement for locating the outer plates out of engagement with the inner disc when the clutch is disengaged.

15. In a clutch, the combination of an inner friction disc; friction plates at each side of the disc; means for closing the plates; springs for separating the plates to disengage the clutch; a locating plate between the friction plates, said plate having a limited yielding movement for locating the outer plates out of engagement with the inner disc when the clutch is disengaged, said plate being in the form of a ring and having a pin extending into one friction plate; means acting on the pin for limiting the movement; and springs acting on the locating plate.

In testimony whereof I have hereunto set my hand.

EDWIN J. ARMSTRONG.